United States Patent
Yamane et al.

(10) Patent No.: US 11,785,927 B2
(45) Date of Patent: Oct. 17, 2023

(54) HOLLOW LURE WITH A WEIGHT HOUSING SPACE AND A SPRING

(71) Applicant: Shimano Inc., Osaka (JP)

(72) Inventors: Takuro Yamane, Osaka (JP); Tatsurou Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 120 days.

(21) Appl. No.: 17/246,475

(22) Filed: Apr. 30, 2021

(65) Prior Publication Data

US 2021/0386043 A1    Dec. 16, 2021

(30) Foreign Application Priority Data

Jun. 12, 2020 (JP) ................. 2020-102238

(51) Int. Cl.
*A01K 85/16* (2006.01)
*A01K 85/01* (2006.01)
*A01K 85/00* (2006.01)

(52) U.S. Cl.
CPC ........ *A01K 85/1837* (2022.02); *A01K 85/017* (2022.02); *A01K 85/16* (2013.01)

(58) Field of Classification Search
CPC ........ A01K 85/16; A01K 85/02; A01K 85/00; A01K 83/02; A01K 85/01; A01K 83/04; A01K 97/24; A01K 85/005; A01K 85/12; A01K 85/18; A01K 91/10; A01K 95/00; A01K 95/005; A01K 97/02; A01K 99/00; A01K 85/017; A01K 85/1837
USPC ............. 43/35, 42.31, 42.39, 42.48
See application file for complete search history.

(56) References Cited

U.S. PATENT DOCUMENTS

| | | | | |
|---|---|---|---|---|
| 1,442,981 A | * | 1/1923 | John .............. | A01K 85/16 43/26.2 |
| 2,152,275 A | * | 3/1939 | Parkins ........... | A01K 85/16 43/42.23 |
| 2,470,861 A | * | 5/1949 | Prentice ......... | A01K 85/02 43/42.36 |
| 2,485,946 A | * | 10/1949 | Victor ............ | A01K 85/02 43/35 |
| 2,505,052 A | * | 4/1950 | Kridler ........... | A01K 85/02 43/35 |
| 2,521,555 A | * | 9/1950 | Widmer .......... | A01K 85/02 43/42.36 |

(Continued)

FOREIGN PATENT DOCUMENTS

JP    2011-229423 A    11/2011
JP    2015-173645 A    10/2015

*Primary Examiner* — Darren W Ark
*Assistant Examiner* — Zoe Tam Tran
(74) *Attorney, Agent, or Firm* — Global IP Counselors, LLP

(57) ABSTRACT

A lure includes a body, a weight, a guide member and an elastic member. The body is hollow and has a head in a front portion and a tail in a rear portion thereof. The weight is inside of the body so as to be movable in a front-rear direction. The guide member is in the body and configured to guide movement of the weight in the front-rear direction. The elastic member is in the body and is configured to generate an energizing force to move the weight in a forward direction. The weight is movable backward against the energizing force of the elastic member and one of the weight and the elastic member is inserted into an inside of the other.

7 Claims, 11 Drawing Sheets

(56) References Cited

U.S. PATENT DOCUMENTS

| | | | | | |
|---|---|---|---|---|---|
| 2,546,614 | A | * | 3/1951 | Prentice | A01K 85/02 43/37 |
| 2,709,868 | A | * | 6/1955 | Simmons | A01K 93/02 43/42.22 |
| 2,729,013 | A | * | 1/1956 | Chandler | A01K 85/02 43/35 |
| 2,739,407 | A | * | 3/1956 | Godsey | A01K 85/18 43/42.15 |
| 2,906,051 | A | * | 9/1959 | Joseph | A01K 85/02 43/35 |
| 3,037,315 | A | * | 6/1962 | Klawitter | A01K 85/00 43/17.2 |
| 3,410,019 | A | * | 11/1968 | Landi | A01K 85/02 43/37 |
| 3,816,953 | A | * | 6/1974 | Hameen-Anttila | A01K 83/02 43/35 |
| 4,166,334 | A | * | 9/1979 | Talalaj | A01K 85/02 43/42.43 |
| 4,980,987 | A | * | 1/1991 | Ramsey, Sr. | A01K 85/02 43/34 |
| 4,982,524 | A | * | 1/1991 | Vissing | A01K 97/24 43/17.2 |
| 5,992,084 | A | * | 11/1999 | Kitagawa | A01K 85/16 43/42.22 |
| 2004/0216355 | A1 | * | 11/2004 | Gore | A01K 79/02 43/17.5 |
| 2019/0313616 | A1 | * | 10/2019 | Aguilar | A01K 85/01 |

* cited by examiner

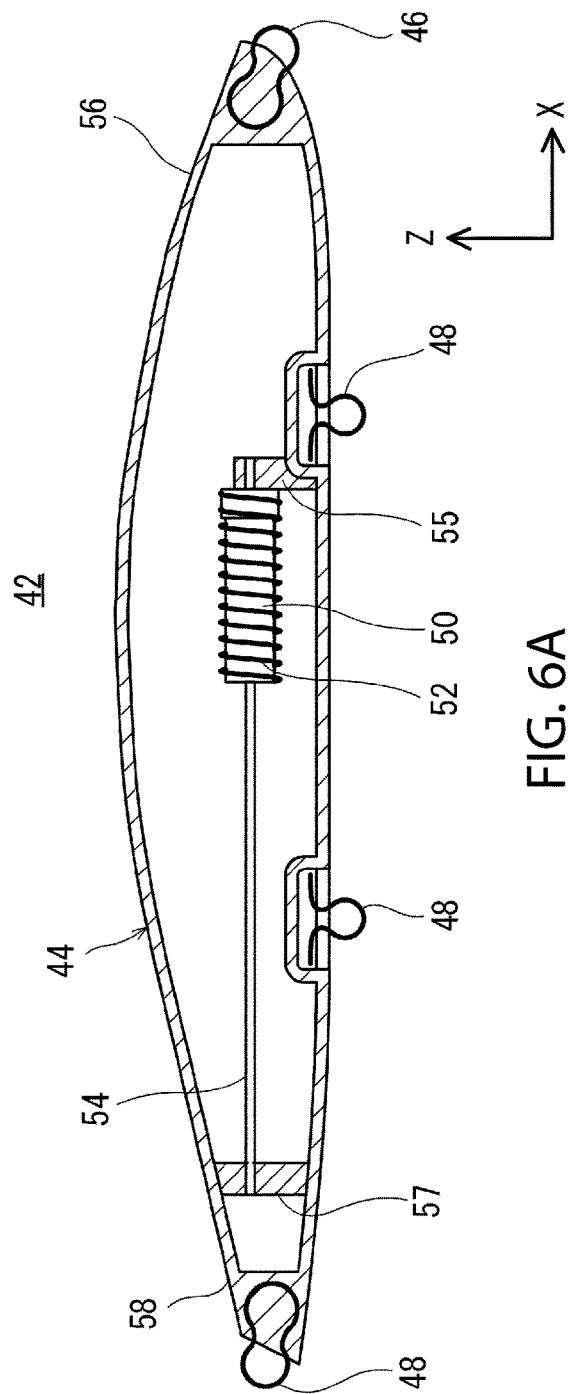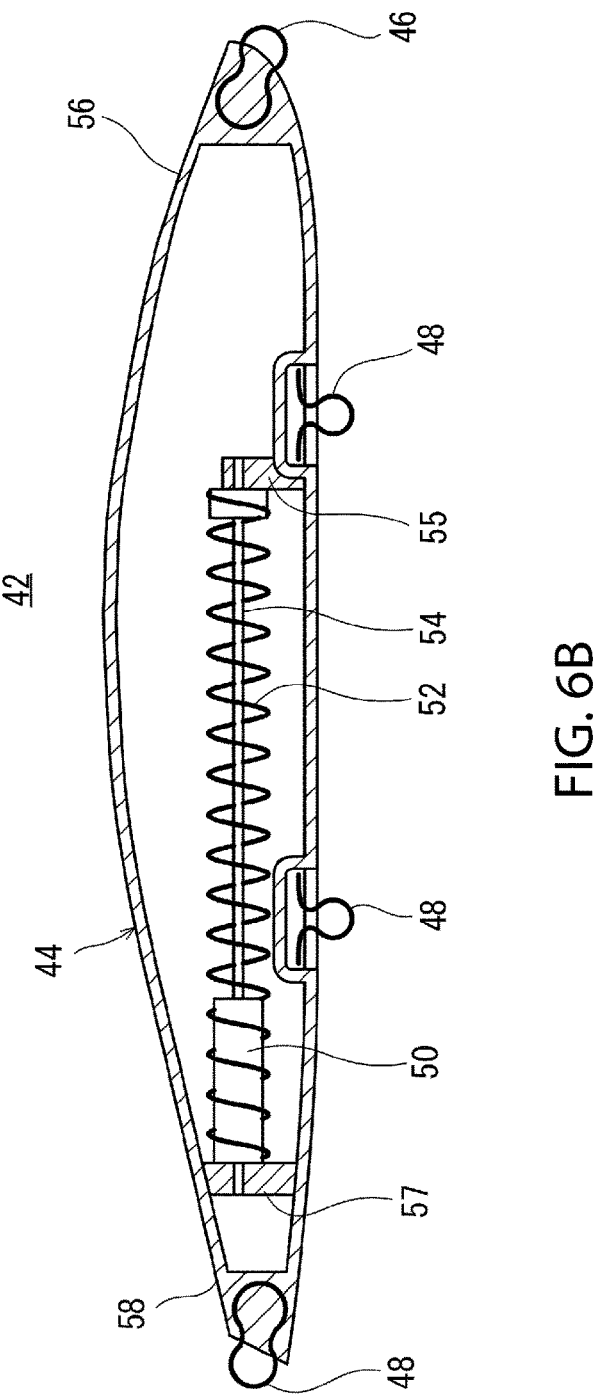

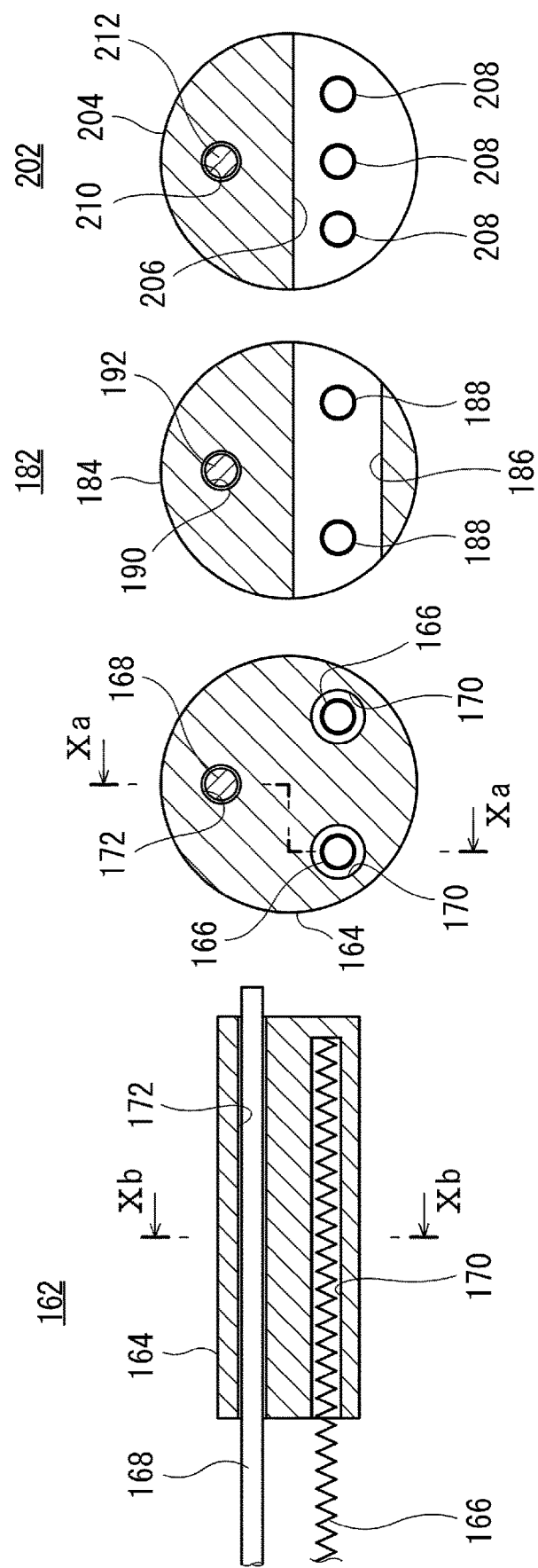

HOLLOW LURE WITH A WEIGHT HOUSING SPACE AND A SPRING

CROSS-REFERENCE TO RELATED APPLICATIONS

This application claims priority to Japanese Patent Application No. 2020-102238, filed on Jun. 12, 2020. The entire disclosure of Japanese Patent Application No. 2020-102238 is hereby incorporated herein by reference.

BACKGROUND

Field of the Invention

The present invention relates to a fishing lure.

Background Art

Large fish, such as Largemouth Bass, Yellowtail, juvenile Yellowtail, and Sea Bass, prey on small fish. These large fish are generally called fish eaters. Lure fishing, where the lure imitates bait, such as small fish, is widespread as a means of capturing fish eaters. A conventional lure can be cast through the air and eventually land in on the water. As can be understood, a lure appears to swim through the water by winding the fishing line, and a fish eater that mistakes the lure as a bait will take the lure. A hook attached to the lure pierces into the fish eater and the fish eater gets caught.

A typical lure includes a body and a weight built-in to the body. The position of a weight affects the posture of a lure while being cast through the air. A lure in which the position of a weight is set so that the flight posture is proper, tends to fly farther. The position of a weight also affects the posture of a lure in the water. A lure, in which the position of a weight is set so that the posture in the water is proper, is more appealing to fish eaters. This type of lure is capable of achieving a high hit rate.

Japanese Laid-Open Patent Publication No. 2011-229423 and Japanese Laid-Open Patent Publication No. 2015-173645 disclose a lure including a center of gravity shift mechanism. Inside of a body of these lures, a weight that is capable of moving in the longitudinal direction (front-rear direction) of the lure and a compression coil spring that is located at the tail side of the weight and energizes the weight in the head direction are built-in. When the lure is cast, the weight compresses the compression coil spring by inertia and moves to the tail side. When the lure lands on the water, the weight is pushed back to the head side by the compression coil spring. Due to this movement of the weight, proper posture in the air and in the water of the lure is realized.

Japanese Laid-Open Patent Publication No. 2011-229423 also discloses a lure that includes a built in weight that is capable of moving in the longitudinal direction (front-rear direction) of the lure and a built in tensile coil spring that is located on the head side of the weight and energizes the weight in the head direction. When this lure is cast, the weight stretches the tensile coil spring by inertia and moves to the tail side. When the lure lands in the water, the weight is pulled back to the head side by the tensile coil spring. Due to this movement of the weight, proper posture of the lure in the air and proper posture and movement of the lure in the water is realized.

SUMMARY

It has been found that in a lure in which a coil spring is arranged on the tail side of a weight, the compression spring can be an obstacle, and the weight cannot move to the end of the tail side. Thus, it is possible that the proper posture of the lure while flying will not be achieved. Also, regardless of whether the coil spring is arranged on the tail side or the head side of the weight, the weight and the coil spring are lined up in series, and thus, the length of a center of gravity shift mechanism is long. In recent years, due to the multi-functionality of lures, various mechanisms, such as light reflecting mechanisms and sound emitting mechanisms, are built into or integrated into the lure. By integrating these mechanisms or the like, the position where the center of gravity shift mechanism can be disposed is limited, and thus, the range of movement of the center of gravity in the center of gravity shift mechanism can be limited.

The object of the present invention is to provide a lure having a center of gravity shift mechanism capable of maximizing the movement of the center of gravity within a limited range and realizing excellent posture in the air and in the water.

A lure according to the present invention includes a body that is hollow and has a head in the front portion and a tail in the rear portion, a weight built-in to the inside of the body so as to be movable in the front-rear direction, a guide member built-in to the inside of the body and guides the movement of the weight in the front-rear direction, and an elastic member built-in to the inside of the body and energizes the weight forward. The weight is configured to be capable of moving backward against the energizing force of the elastic member. One of the weight and the elastic member is inserted into the inside of the other.

Preferably, the weight includes a housing space, and the elastic member is inserted into the housing space.

Preferably, the weight has an opening to the housing space either on the front portion or the rear portion thereof.

Preferably, the housing space is a hole or a groove.

In another embodiment, an elastic member is a coil spring, and a weight can be inserted into the inside of the coil spring.

Preferably, the elastic member includes a first point where the elastic member is connected to the body and a second point located behind the first point, where the elastic member is connected to the weight, and is pulled by the weight that moves backward when casting. At this moment, it is preferable that a ratio F/W that is a ratio of a maximum energizing force F of the elastic member to a mass W of the weight is 1.0 or more and 4.0 or less.

In another embodiment, the elastic member can include a first point where the elastic member is connected to the body and a second point located in front of the first point where the elastic member is connected to the weight, and can be compressed by the weight that moves backward when casting. At this moment, it is preferable that a ratio F/W that is a ratio of a maximum energizing force F of the elastic member to a mass W of the weight is 1.0 or more and 4.0 or less.

Preferably, the density of the weight is 18.0 g/cm$^3$ or more.

Preferably, the guide member is attached to the body and penetrates the weight back and forth.

In a lure according to embodiments of the present invention, one of a weight and an elastic member is inserted inside the other. The weight and the elastic member can have an overlap. As such, the weight can be moved to the end on the tail side. This lure realizes a center of gravity shift mechanism that is capable of moving the required center of gravity within a limited range. This center of gravity shift mechanism realizes an excellent posture of the lure in the air and in the water.

BRIEF DESCRIPTION OF THE DRAWINGS

FIG. 6A is a cross-sectional view of a lure according to another embodiment of the present invention and FIG. 6B is a cross-sectional view showing a state after the weight of the lure in FIG. 6A has moved.

FIG. 10A is a cross-sectional view of a lure according to still another embodiment of the present invention cut along the front-rear direction, FIG. 10B is a cross-sectional view of the lure in FIG. 10A cut along the left-right direction, and FIGS. 10C and 10D are cross-sectional views of the lures according to still another embodiment in the present invention cut along the left-right direction.

DETAILED DESCRIPTION OF EMBODIMENTS

Hereinafter, the present invention will be described in detail based on preferred embodiments with reference to drawings as appropriate.

First Embodiment

Figure 1:
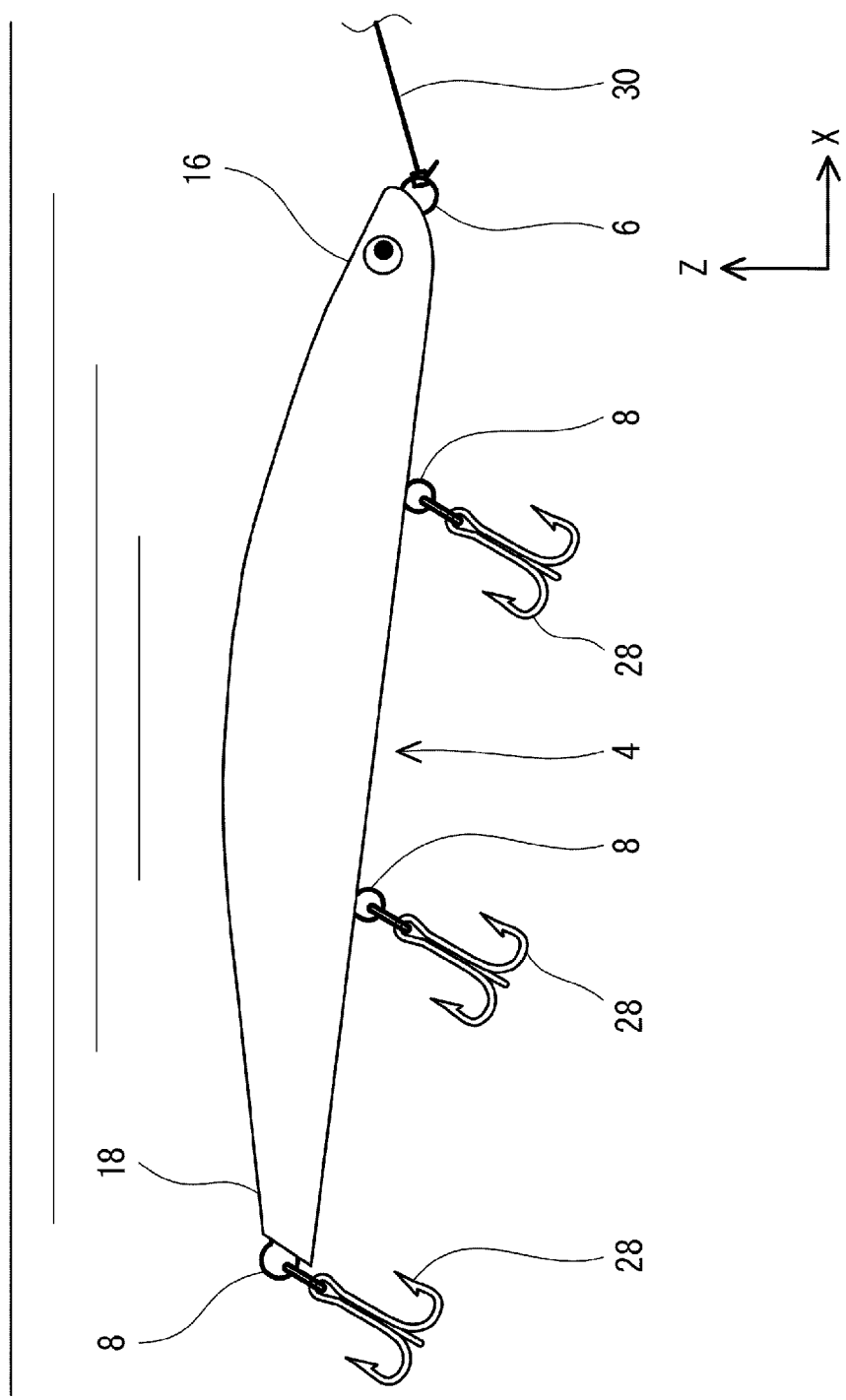
FIG. 1 is a side view of a lure according to one embodiment of the present invention.
Figure 2:
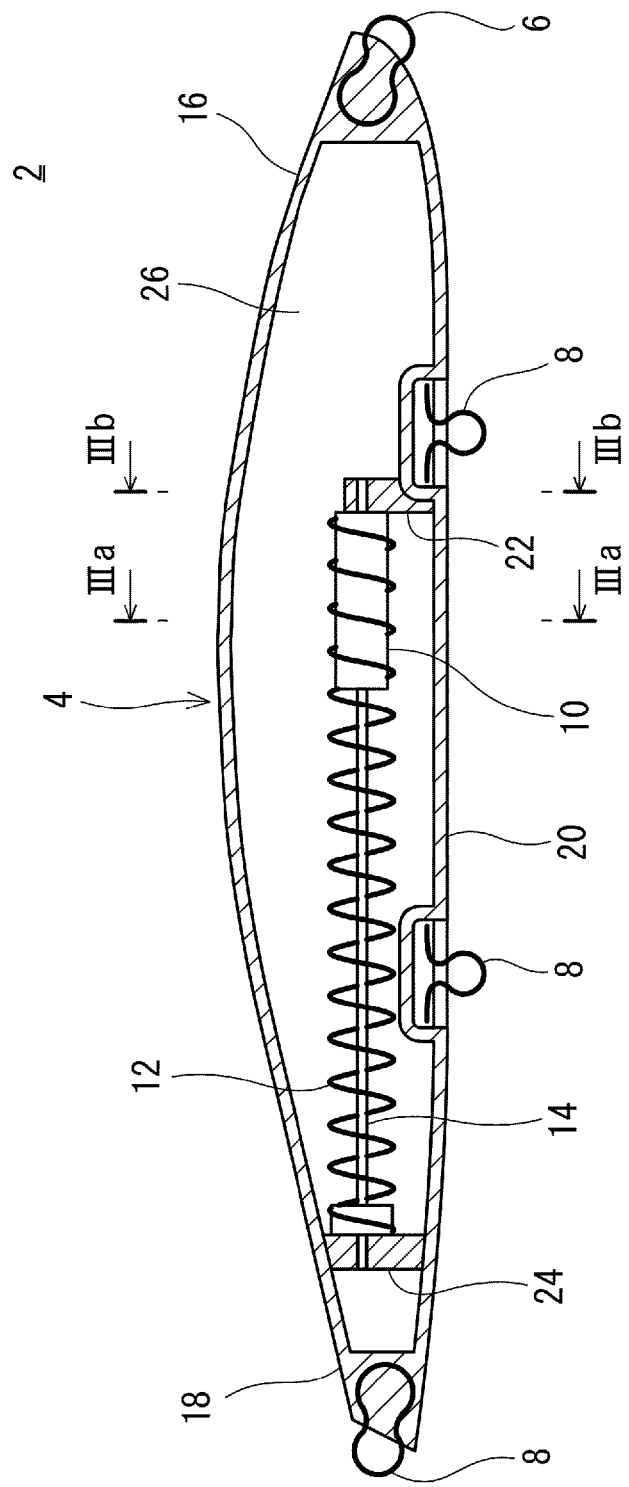
FIG. 2 is a cross-sectional view of the lure in FIG. 1 cut along the front-rear direction.
Figure 3B:
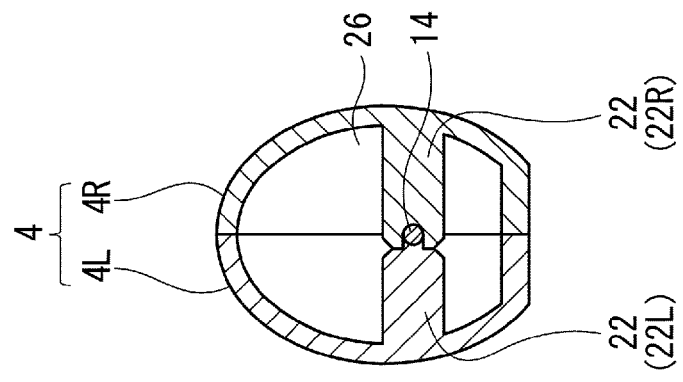
FIG. 3A is a cross-sectional view of the lure in FIG. 2 taken along line IIIa-IIIa and FIG. 3B is a cross-sectional view of the lure in FIG. 2 taken along line IIIb-IIIb.
Figure 3A:
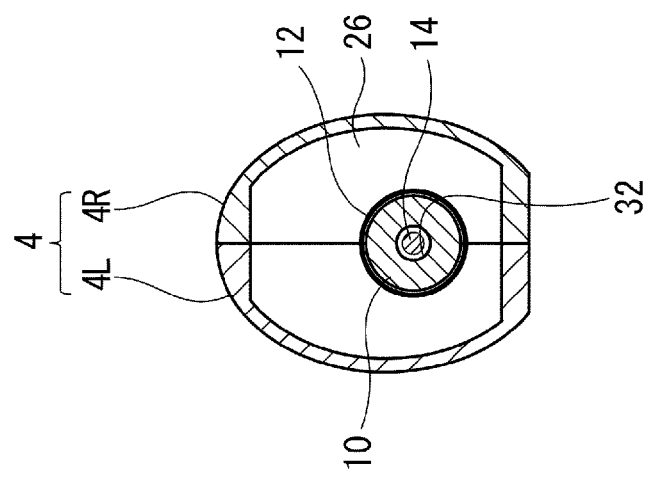

FIG. 1 is a side view showing a lure 2 according to one embodiment of the present invention. In FIG. 1, the direction indicated by arrow X is the front of the lure 2 and the opposite direction is the rear of the lure 2. The direction indicated by arrow Z is the top of the lure 2 and the opposite direction is the bottom of the lure 2. The direction perpendicular to the paper surface is the left-right direction of the lure 2. FIG. 2 is a cross-sectional view of the lure 2 in FIG. 1, cut along the front-rear direction. FIG. 3A is a cross-sectional view taken along the line IIIa-IIIa of FIG. 2 and FIG. 3B is a cross-sectional view taken along the line IIIb-IIIb of FIG. 2. As shown in FIGS. 1 and 2, the lure 2 includes a body 4, a line eye 6, three hook eyes 8, a weight 10, an elastic member 12, and a shaft 14.

The body 4 has an outer shape similar to a small bait fish. The body 4 has a head 16 on the front portion and a tail 18 on the rear portion. The front is the head 16 side and the rear is the tail 18 side. As shown in FIG. 2, the body 4 is hollow with a hollow space 26 inside thereof. As shown in FIGS. 3A and 3B, the body 4 is formed by joining a left piece 4L and a right piece 4R. Typically, the body 4 is made of synthetic resin. A preferred synthetic resin is ABS resin; however, the body can be formed from other materials, such as a metal or wood material.

As shown in FIG. 2, the body 4 has a main body 20, a front wall 22, and a rear wall 24. The front wall 22 is located inside the hollow space 26 and is fixed to and protrudes from the main body 20 inside the hollow space 26. As shown in FIG. 3B, the front wall 22 has a left portion 22L and a right portion 22R. The front wall 22 sandwiches and fixes the shaft 14 by the left portion 22L and the right portion 22R. As shown in FIG. 2, in this embodiment, the front wall 22 is located closer to the head 16 side than the center of the body 4. The weight 10 cannot move beyond the front wall 22. The front wall 22 functions as a stopper when the weight 10 moves forward.

The rear wall 24 is located inside of the hollow space 26. The rear wall 24 protrudes from the main body 20 inside of the hollow space 26. The rear wall 24 is fixed to the main body 20. Even though it is not shown, the rear wall 24 has a left portion and a right portion. The rear wall 24 sandwiches and fixes the shaft 14 by the left portion and the right portion. As shown in FIG. 2, in this embodiment, the rear wall 24 is located at the tail 18 of the body 4.

The weight 10 cannot move beyond the rear wall 24. Thus, as can be understood, the rear wall 24 functions as a stopper when the weight 10 moves backward.

The line eye 6 and the hook eyes 8 are formed by bendable metal wires. The typical material of a metal wire is stainless steel. As shown in FIG. 2, a part of the metal wire is embedded in the body 4 and the remaining part is exposed from the body 4. The embedding of the line eye 6 and the hook eyes 8 fixes these elements onto the body 4. A hook 28 can be attached to each of the hook eyes 8, and a fishing line 30 can be connected to the line eye 6.

The weight 10 is built-in to the body 4, and extends in the front-rear direction. As shown in FIG. 3A, the shape of the weight 10 is a circle in the cross-sectional view of the weight 10, cut along the left-right direction. The weight 10 has a hole 32 penetrating in the front-rear direction. The hole 32 penetrates the center of the weight 10 in the front-rear direction. As shown in FIGS. 2 and 3A, the shaft 14 is inserted inside of the hole 32. This structure enables the weight 10 to be movable in the front-rear direction. The specific gravity of the weight 10 is larger than the specific gravity of the body 4. Examples of the material of the weight 10 include lead, lead alloy, brass, tungsten, tungsten alloy, steel, and stainless steel.

The elastic member 12 is built-in to the body 4, and as shown in FIG. 2, the elastic member 12 can be a coil spring 12. The coil spring 12 in FIG. 2 is in a uncompressed state, such that the coil spring 12 is in a free length without a force being applied in the front-rear direction. As it will be described later, the coil spring 12 is significantly compressed by the weight 10 when casting. The coil spring 12 can be used in a compressed state or in a state in which no force is applied (i.e., an uncompressed state). As one of ordinary skill would understand, the coil spring 12 can be a compression coil spring.

The elastic member 12 includes a first point where the elastic member 12 is connected to the body 4 and a second point located in front of the first point where the elastic member 12 is connected to the weight 10. In this embodiment, the rear end of the elastic member 12 is the first point and the first point is connected to the rear wall 24. The front end of the elastic member 12 is the second point and the second point is connected to the front end of the weight 10. As shown in FIG. 2, the weight 10 is inserted inside of the elastic member 12 (i.e., inside of the compression coil spring 12). In this embodiment, the entire weight 10 is inserted inside of the elastic member 12.

The second point of the elastic member 12 does not have to be the front end of the elastic member 12, nor does the second point of the elastic member 12 have to be connected to the front end of the weight 10. The elastic member 12 and the weight 10 can be connected so that the weight 10 enters the inside of the elastic member 12. The first point of the elastic member 12 does not have to be the rear end of the elastic member 12. The first point can be connected to the body 4 behind the second point so as not to interfere with the movement of the weight 10.

The shaft 14 is built-in to the body 4. The shaft 14 extends in the front-rear direction, and is bridged between and fixed to the front wall 22 and the rear wall 24. The shaft 14 penetrates the hole 32 of the weight 10. As shown in FIG. 3A, in this embodiment, the shaft 14 penetrates the center of the weight 10, such that the weight 10 is movable along the shaft 14 in the front-rear direction. Thus, as can be understood, the shaft 14 can be a guide member that guides the movement of the weight 10 in the front-rear direction. Typical materials for the shaft 14 include steel, stainless steel, copper alloy, titanium alloy, and synthetic resin.

In this embodiment, the elastic member 12 and the shaft 14 enable the weight 10 to move between the front wall 22 and the rear wall 24. Due to the movement of the weight 10, the center of gravity of the lure 2 moves. The weight 10, the elastic member 12, and the shaft 14 constitute a center of gravity shift mechanism of the lure 2. (0031)

Figure 4:
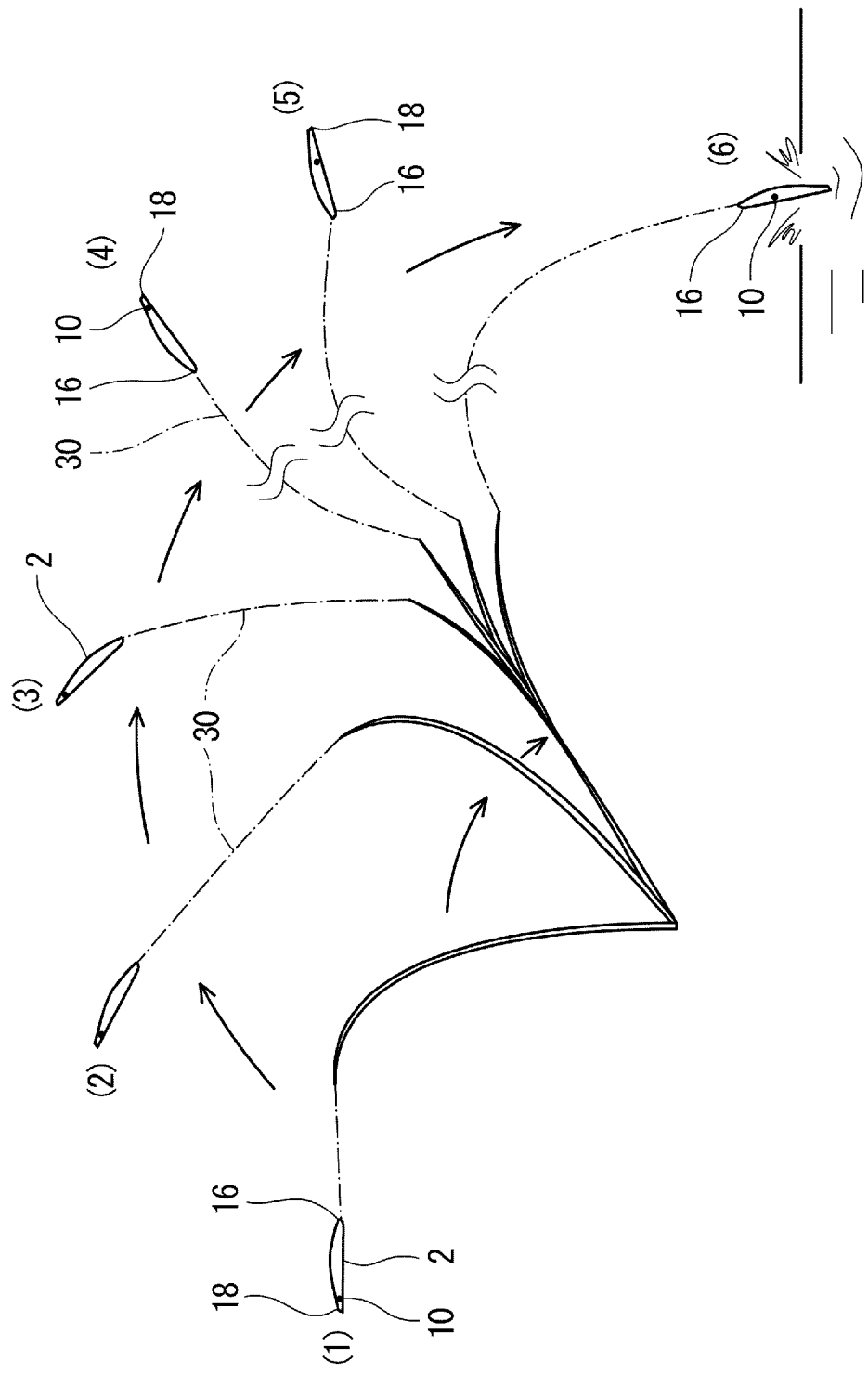
FIG. 4 is a side view showing states of the lure in FIG. 1 when casted in chronological order.

In FIG. 4, casting states of the lure 2 are shown in chronological order. (1) indicates the start of casting, (2) and (3) indicate states in which the lure 2 is driven (or pulled) by the fishing line 30, (4) and (5) indicate states in which the lure 2 is released from the drive by the fishing line 30 and is gliding, and (6) indicates a state in which the lure 2 has just landed on the water.

Figure 5:
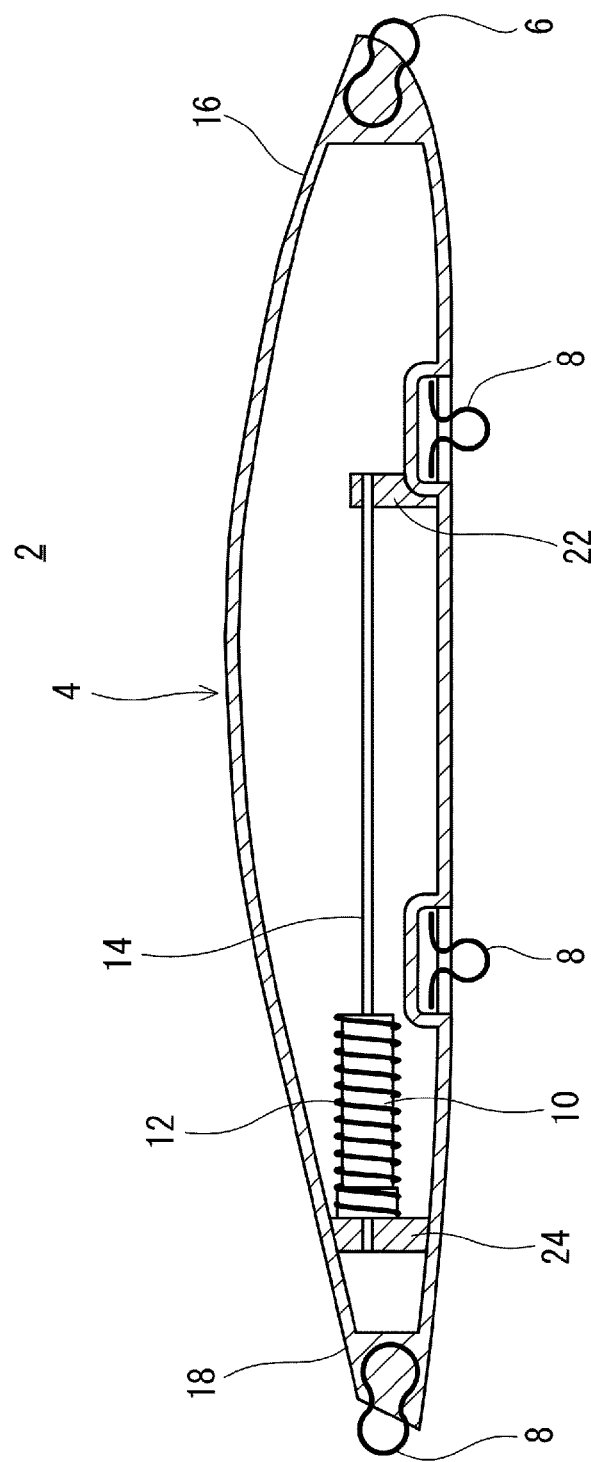
FIG. 5 is a cross-sectional view showing a state after a weight of the lure in FIG. 2 has moved.

By being cast, the body 4 flies through the air, and the weight 10 instantly compresses the compression coil spring 12 due to inertia. The lure 2 in the states of (2) and (3) of FIG. 4 is illustrated in FIG. 5. In this state, the weight 10 moves backward against the energizing force of the compression coil spring 12. The weight 10 is inserted inside of the compression coil spring 12, therefore, the weight 10 moves backward until it comes into contact with the rear wall 24. Thus, as can be understood, in FIG. 5, the weight 10 has moved to the tail 18 side of the lure 2. Since, as shown in FIG. 4, the lure 2 flies with the tail 18 at the front, the lure 2 flies in a state in which the center of gravity is at the front.

The lure 2 slows down due to the resistance of the fishing line and the air while flying—i.e., negative acceleration acts on the lure 2. At the beginning of the deceleration, the weight 10 is located at the tail 18 side (the leading side of the flight posture) against the energizing force of the compression coil spring 12 due to inertia. As the lure 2 decelerates further, the acceleration decreases. The compression coil spring 12 energizes the weight 10 toward the forward position. Thus, the weight 10 is gradually pushed back towards the head 16 side due to the energizing force of the compression coil spring 12. After landing on the water, the weight 10 is returned to the position shown in FIG. 2. The lure 2 swims in a state in which the center of gravity is closer to the head 16 side than the center.

In the following description, the effects of the embodiments of the present invention will be described.

In the lure 2 according to embodiments of the present invention, the weight 10 is located at the tail 18, when cast. The lure 2 flies through the air with the tail 18 in the front, and in a state in which the center of gravity is at the front. This configuration contributes to an excellent aerial posture, which enables the embodiment of this lure 2 to be capable of flying far through the air. In the lure 2, the weight 10 is located closer to the head 16 side than the center in the water. The center of gravity of the lure 2 is located closer to the head 16 side than the center. This contributes to an excellent underwater posture. With this lure 2, a high hit rate can be achieved.

In this embodiment of the lure 2, the weight 10 is inserted inside of the compression coil spring 12 which is the elastic member 12. As shown in FIG. 5, the compression coil spring 12 does not interfere with the movement of the weight 10 towards the tail 18 side. The weight 10 is capable of moving as far as the rear wall 24 which is the stopper. With this embodiment of the lure 2, the position of the center of gravity in the air can be set to be near the end on the tail 18 side. This contributes to an excellent aerial posture which enables the embodiment of this lure 2 to be capable of flying far through the air.

In this embodiment of the lure 2, the weight 10 is inserted inside of the compression coil spring 12, therefore, any limitation in the moving range of the weight 10 is small and the degree of freedom in installing a center of gravity shift mechanism is increased. Therefore, in this embodiment of the lure 2, it is easy to embed other mechanisms. With the lure 2, a center of gravity shift mechanism capable of moving a required center of gravity within a limited range is realized. This contributes to an excellent aerial posture and an excellent underwater posture of the lure 2.

In order to increase the flying distance of the lure 2, it is preferable that the weight 10 is located at the tail 18 when the cast lure 2 is being elevated, to prevent the lure 2 from being elevated too much due to the lift force. When the lure 2 is coming down, it is preferable that the weight 10 is moved to the head 16 side rather than the tail 18 to prevent the head of the lure 2 from being lowered too much and the lift force being small. After the lure 2 has landed on the water, it is preferable that the weight 10 is moved toward the front wall 22. In order to realize these positions of the weight 10, the balance between the energizing force of the elastic member 12 and the weight of the weight 10 is important.

A maximum energizing force of the elastic member 12 is referred to as a maximum energizing force F. With the compression coil spring 12, the force with which the spring 12 pushes the weight 10 when the spring 12 is most compressed, is the maximum energizing force F. A ratio F/W of the maximum energizing force F of the elastic member 12 to a weight W of the weight 10 is preferably 1.0 or more. By setting the ratio F/W to 1.0 or more, the compression coil spring 12 can push the weight 10 back towards the head 16 side when the lure 2 is coming down. By setting the ratio F/W to 1.0 or more, the compression coil spring 12 can push the weight 10 back to the position of the front wall 22 in a short amount of time, after the lure 2 has landed on the water. This contributes to an excellent flight posture and an excellent underwater posture of the lure 2. From this point of view, it is more preferable that the ratio F/W is 1.6 or more and even more preferable is 2.0 or more.

The ratio F/W is preferably 4.0 or less. By setting the ratio F/W to 4.0 or less, the weight 10 can immediately move to the position of the rear wall 24 when casting the lure 2. By setting the ratio F/W to 4.0 or less, the weight 10 is prevented from being pushed back to the head 16 side when the lure 2 is being elevated. This contributes to an excellent flight posture of the lure 2. From this point of view, it is more preferable that the ratio F/W is 3.4 or less and even more preferable is 3.0 or less.

The density of the weight 10 is preferably 18.0 g/cm³ or more. The weight 10 having a density of 18.0 g/cm³ or more has a weight sufficient to set the flight posture and the underwater posture with a small cubic volume. In this embodiment of the lure 2, it is easy to embed other mechanisms. From this point of view, it is more preferable for the weight 10 to have a density of 19.0 g/cm³ or more.

The material of the weight 10 is preferably tungsten or tungsten alloy. A weight 10 whose material is tungsten or tungsten alloy has high density. This weight 10 has a weight sufficient to set a flight posture and an underwater posture with a small cubic volume. In this lure 2, it is easy to embed other mechanisms.

Second Embodiment

FIG. 6A is a cross-sectional view that illustrates a lure 42 according to another embodiment of the present invention. FIG. 6A is a cross-sectional view in which the lure 42 is cut along the front-rear direction. In FIGS. 6A and 6B, the direction indicated by arrow X is the front of the lure 42 and the opposite direction is the rear of the lure 42. The direction indicated by arrow Z is the top of the lure 42 and the opposite direction is the bottom of the lure 42. The direction perpendicular to the paper surface is the left-right direction of this lure 42. The lure 42 includes a body 44, a line eye 46, three hook eyes 48, a weight 50, an elastic member 52, and a shaft 54. The body 44, the line eye 46, the hook eyes 48, and the shaft 54 of this lure 42 are the same as those of the lure 2 in FIG. 2.

The weight 50 is built-in to the body 44, and extends in the front-rear direction. The shape of the weight 50 is a circle in cross-sectional view of the weight 50, cut along the front-rear direction. The weight 50 has a hole penetrating in the front-rear direction, in the center of the weight 50 in the front-rear direction. As shown in FIG. 6A, the shaft 14 is inserted into this hole. In this way, the weight 50 is movable in the front-rear direction. The specific gravity of the weight 50 is larger than the specific gravity of the body 44. The examples of the material of the weight 50 include lead, lead alloy, brass, tungsten, tungsten alloy, steel, and stainless steel.

The elastic member 52 is built-in to the body 44, and as shown in FIG. 6A is a coil spring 52. The coil spring 52 in FIG. 6A is in an unstretched state, and thus as can be understood, is in a free length without a force being applied in the front-rear direction. As it will be described later, the coil spring 52 is significantly stretched by the weight 50 when casting. The coil spring 52 can be used in a stretched state or in a state where no force is applied (i.e., an unstretched state). As one of ordinary skill would understand, the coil spring 52 can be a tension coil spring.

The elastic member 52 includes a first point where the elastic member 52 is connected to the body 44 and a second point located behind the first point where the elastic member 52 is connected to the weight 50. In this embodiment, the front end of the elastic member 52 is the first point and the first point is connected to the front wall 55. The back end of the elastic member 52 is the second point and the second point is connected to the rear end of the weight 50. As shown in FIG. 6A, the weight 50 is inserted inside of the elastic member 52. In this embodiment, the entire weight 50 is inserted inside of the elastic member 52.

The second point of the elastic member 52 does not have to be the rear end of the elastic member 52, nor does the second point of the elastic member 52 have to be connected to the rear end of the weight 50. The elastic member 52 and the weight 50 can be connected so that the weight 50 enters the inside of the elastic member 52. The first point of the elastic member 52 does not have to be the front end of the elastic member 52. The first point may be connected to the body 44 in front of the second point so as not to interfere with the movement of the weight 50.

In this embodiment of the lure 42, by being cast, the body 44 flies through the air and the weight 50 instantly stretches the tensile coil spring 52 due to inertia. The lure 42 in this state is shown in FIG. 6B. The weight 50 moves backward against the energizing force of the tensile coil spring 52 until it comes into contact with a rear wall 57. Thus, the weight 50 has moved to a tail 58 side of the lure 42. The lure 42 flies though the air with the tail 58 in the front, and in a state in which the center of gravity is at the front.

The lure 42 slows down due to the resistance of a fishing line and the air while flying through the air. Negative acceleration acts on the lure 42, and at the beginning of the deceleration, the weight 50 is located at the tail 58 side against the energizing force of the tensile coil spring 52, due to inertia. However, as the lure 42 decelerates further, the acceleration reduces. The tensile coil spring 52 energizes the weight 50 forward, and the weight 50 is gradually pushed back towards the head 56 side due to the energizing force of the tensile coil spring 52. After landing on the water, the weight 50 is returned to the position shown in FIG. 6A, such that when the lure 42 swims in the water, the weight 50 is located at the position shown in FIG. 6A. The lure 42 swims in a state in which the center of gravity is closer to the head 56 side than the center.

In the lure 42 according to embodiments of the present invention, the weight 50 is located at the tail 58, when cast, and the lure 42 flies though the air with the tail 58 in the front. Thus, the lure 42 flies though the air in a state in which the center of gravity is at the front, which contributes to an excellent aerial posture. As can be understood, this embodiment of the lure 42 is capable of flying far. In the lure 42, the weight 50 is located closer to the head 56 side than the center, under water. The center of gravity of the lure 42 is located closer to the head 56 side than the center, which contributes to an excellent underwater posture. As can be understood, this embodiment of the lure 42, a high hit rate can be achieved.

In the lure 42, the weight 50 is inserted inside of the tensile coil spring 52 which is the elastic member 52. As shown in FIG. 6A, when the weight 50 is located at the head 56 side, the weight 50 and the tensile coil spring 52 overlap. The tensile coil spring 52 is not located on the head 56 side of the weight 50. Thus, in this lure 42, it is easy to embed other mechanisms.

In the lure 42, the weight 50 is inserted inside of the tensile coil spring 52, therefore, any limitation in the moving range of the weight 50 is small and the degree of freedom in installing a center of gravity shift mechanism is increased. In this lure 42, it is easy to embed other mechanisms. Therefore, in this embodiment of the lure 42, a center of gravity shift mechanism capable of moving a required center of gravity within a limited range is realized. This configuration contributes to an excellent aerial posture and an excellent underwater posture of the lure 42.

With this tensile coil spring 52, the force with which the spring 52 pulls the weight 50 when the spring 52 is most stretched is a maximum energizing force F. The ratio F/W of the maximum energizing force F to a weight W of the weight 50 is preferably 1.0 or more. By setting the ratio F/W to 1.0 or more, the tensile coil spring 52 can pull the weight 50 back towards the head 56 side when the lure 42 is coming down. By setting the ratio F/W to 1.0 or more, the tensile coil spring 52 can pull the weight 50 back to the position of the front wall 55 in a short amount of time, after the lure 42 has landed on the water. This contributes to an excellent flight posture and an excellent underwater posture of the lure 42. From this point of view, it is more preferable that the ratio F/W is 1.6 or more and 2.0 or more is even more preferable.

The ratio F/W is preferably 4.0 or less. By setting the ratio F/W to 4.0 or less, the weight 50 can immediately move to the position at the rear wall 57 when casting the lure 42. By setting the ratio F/W to 4.0 or less, the weight 50 is prevented from being pulled back to the head 56 side when the lure 42 is being elevated. This configuration contributes to an excellent flight posture of the lure 42. From this point of view, it is more preferable that the ratio F/W is 3.4 or less and 3.0 or less is even more preferable.

Third Embodiment

Figure 7A:
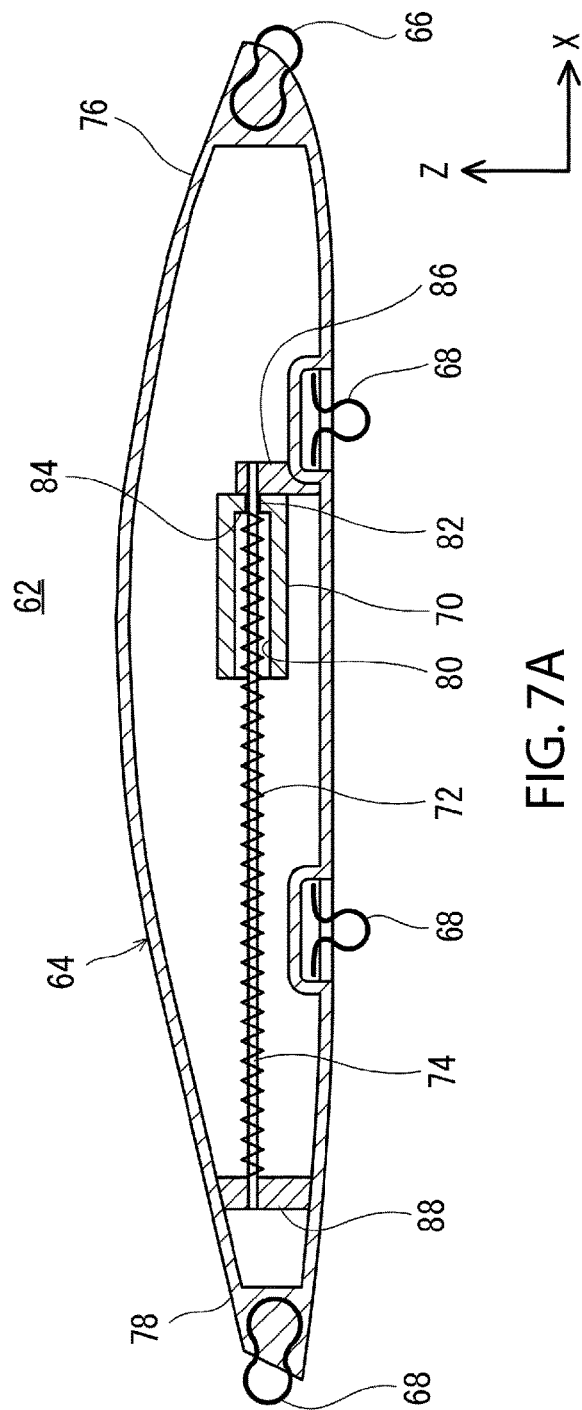
FIG. 7A is a cross-sectional view of a lure according to still another embodiment of the present invention and FIG. 7B is a cross-sectional view showing a state after a weight of the lure in FIG. 7A has moved.
Figure 7B:
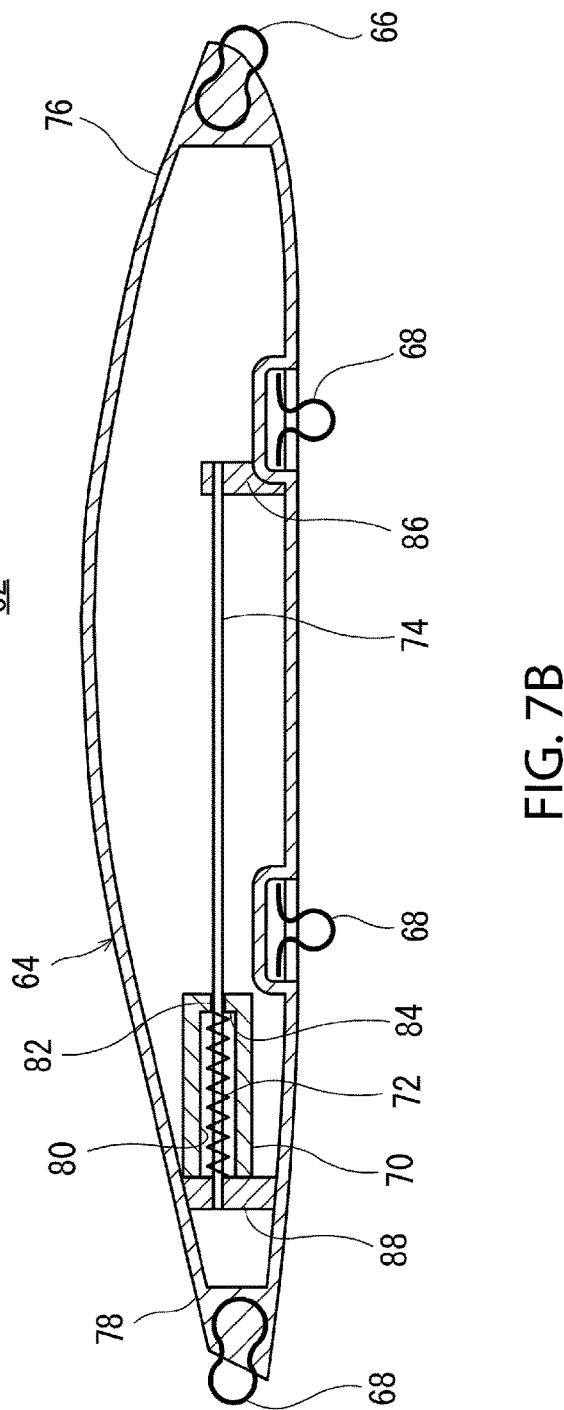

FIG. 7A is a cross-sectional view that illustrates a lure 62 according to still another embodiment of the present invention. This is a cross-sectional view in which the lure 62 is cut along the front-rear direction. In FIGS. 7A and 7B, the direction indicated by arrow X is the front of the lure 62 and the opposite direction is the rear of the lure 62. The direction indicated by arrow Z is the top of the lure 62 and the opposite direction is the bottom of the lure 62. The direction perpendicular to the paper surface is the left-right direction of the lure 62. The lure 62 includes a body 64, a line eye 66, three hook eyes 68, a weight 70, an elastic member 72, and a shaft 74. The body 64, the line eye 66, and the hook eyes 68 of the lure 62 are the same as those of the lure 2 in FIG. 2.

The weight 70 is built-in to the body 64, and the weight 70 extends in the front-rear direction. The shape of the weight 70 is a circle in the cross-sectional view of the weight 70 cut along the front-rear direction. As shown in FIG. 7A, the weight 70 has a hole 80 extending from the rear surface (a surface on a tail 78 side) towards the front (a head 76 side). The elastic member 72 enters the hole 80 from the rear side of the weight 70. The elastic member 72 is inserted inside of the weight 70. The hole 80 of the weight 70 constitutes a housing space for housing the elastic member 72, that has an entrance at the rear.

The weight 70 has a hole 82 passing through from a bottom surface of the hole 80 to a front surface (a surface on the head 76 side) of the weight 70. The inner diameter of the hole 80 is larger than the inner diameter of the hole 82. The shaft 74 passes through the hole 80 and the hole 82. In this way, the weight 70 is movable in the front-rear direction. The specific gravity of the weight 70 is larger than the specific gravity of the body 64. Examples of the material of the weight 70 include lead, lead alloy, brass, tungsten, tungsten alloy, steel, and stainless steel.

The elastic member 72 is built-in to the body 64. As shown in FIG. 7A, this elastic member 72 is a coil spring 72. The coil spring 72 in FIG. 7A is in an uncompressed state, such that the coil spring 72 in FIG. 7A is in a free length without a force being applied in the front-rear direction. As it will be described later, the coil spring 72 is significantly compressed by the weight 70 when casting. The coil spring 72 can used in a compressed state or in a state where no force is applied. Thus, as one of ordinary skill would understand, the coil spring 72 is a compression coil spring.

The elastic member 72 includes a first point where the elastic member 72 is connected to the body 64 and a second point located in front of the first point where the elastic member 72 is connected to the weight 70. In this embodiment, the rear end of the elastic member 72 is the first point and the first point is connected to a rear wall 88. The front end of the elastic member 72 is the second point and the second point is connected to a bottom 84 of the hole 80 of the weight 70. As shown in 7A, the shaft 74 penetrates into the inside of the elastic member 72.

The second point of the elastic member 72 does not have to be the front end of the elastic member 72, nor does the second point of the elastic member 72 have to be connected to the bottom 84 of the hole 80 of the weight 70. The elastic member 72 and the weight 70 can be connected so that the weight 70 enters the inside of the elastic member 72. The first point of the elastic member 72 does not have to be the rear end of the elastic member 72. The first point can be connected to the body 64 behind the second point so as not to interfere with the movement of the weight 70.

The shaft 74 is built-in to the body 64, and extends in the front-rear direction. The shaft 74 is bridged between and sixed to the front wall 86 and the rear wall 88. The shaft 74 passes through the hole 82 and the hole 80 of the weight 70, and penetrates into the inside of the elastic member 72. The weight 70 is movable in the front-rear direction along the shaft 74, such that the shaft 74 is a guide member that guides the movement of the weight 70 in the front-rear direction.

In this embodiment of the lure 62, by being cast, the body 64 flies through the air and the weight 70 instantly compresses the compression coil spring 72 due to inertia. The lure 62 in this state is illustrated in FIG. 7B. The weight 70 moves backward against the energizing force of the compression coil spring 72 until it comes into contact with the rear wall 88. At this point, the entire compression coil spring 72 is inside of the hole 80 of the weight 70, and the weight 70 has moved to the tail 78 side of the lure 62. Since the lure 62 flies through the air with the tail 78 in the front, the lure 62 flies in a state in which the center of gravity is at the front.

The lure 62 slows down due to the resistance of a fishing line and the air while flying through the air. Negative acceleration acts on the lure 62, and at the beginning of the deceleration, the weight 70 is located at the tail 78 side against the energizing force of the compression coil spring 72, due to inertia. However, as the lure 62 decelerates further, this acceleration reduces. The compression coil spring 72 energizes the weight 70 forward, and the weight 70 is gradually pushed back towards the head 76 side due to the energizing force of the compression coil spring 72. After landing on the water, the weight 70 is returned to the position shown in FIG. 7A, such that when the lure 62 swims in the water, the weight 70 is located at the position shown in FIG. 7A. The lure 62 swims in a state in which the center of gravity is closer to the head 76 side than the center.

In the lure 62, the compression coil spring 72 which is the elastic member 72 is inserted inside of the weight 70. As shown in FIG. 7A, the compression coil spring 72 does not interfere with the movement of the weight 70 towards the tail 78 side, so that the weight 70 is capable of moving as far as the rear wall 88 which is a stopper. With this embodiment of the lure 62, the position of center of gravity in the air can be set to be near the end on the tail 78 side. This configuration contributes to an excellent aerial posture, such that the lure 62 is capable of flying far through the air.

In the lure 62, the compression coil spring 72 is inserted inside of the weight 70, therefore, any limitation in the moving range of the weight 70 is small and the degree of freedom in installing a center of gravity shift mechanism is increased. Thus, in this lure 62, it is easy to embed other mechanisms. With this lure 62, a center of gravity shift mechanism capable of moving a required center of gravity within a limited range is realized. This configuration contributes to an excellent aerial posture and an excellent underwater posture of the lure 62.

In the compression coil spring 72, the force with which the spring 72 pushes the weight 70 when the spring 72 is most compressed is a maximum energizing force F. The ratio F/W of the maximum energizing force F to a weight W of the weight 70 is preferably 1.0 or more. By setting the ratio F/W to 1.0 or more, the compression coil spring 72 can push the weight 70 back towards the head 76 side when the lure 62 is coming down. By setting the ratio F/W to 1.0 or more, the compression coil spring 72 can push the weight 70 back to the position of the front wall 86 in a short amount of time, after the lure 62 has landed on the water. This contributes to an excellent flight posture and an excellent underwater posture of the lure 62. From this point of view, it is more preferable that the ratio F/W is 1.6 or more and 2.0 or more is even more preferable.

The ratio F/W is preferably 4.0 or less. By setting the ratio F/W to 4.0 or less, the weight 70 can immediately move to the position of the rear wall 88 when casting the lure 62. By setting the ratio F/W to 4.0 or less, the weight 70 is prevented from being pushed back to the head 76 side when the lure 62 is being elevated. This contributes to an excellent flight posture of the lure 62. From this point of view, it is more preferable that the ratio F/W is 3.4 or less and 3.0 or less is even more preferable.

The density of the weight 70 is preferably 18.0 $g/cm^3$ or more. The weight 70 having a density of 18.0 $g/cm^3$ or more has a weight sufficient to set the flight posture and the underwater posture with a small cubic volume. In this lure 62, it is easy to embed other mechanisms. From this point of view, it is preferable for the weight 70 to have a density of 19.0 $g/cm^3$ or more.

The material of the weight 70 is preferably tungsten or tungsten alloy, i.e., materials that have a high density. As can be understood, the weight 70 has a weight sufficient to set a flight posture and an underwater posture with a small cubic volume. In the lure 62, it is easy to embed other mechanisms.

Fourth Embodiment

Figure 8A:
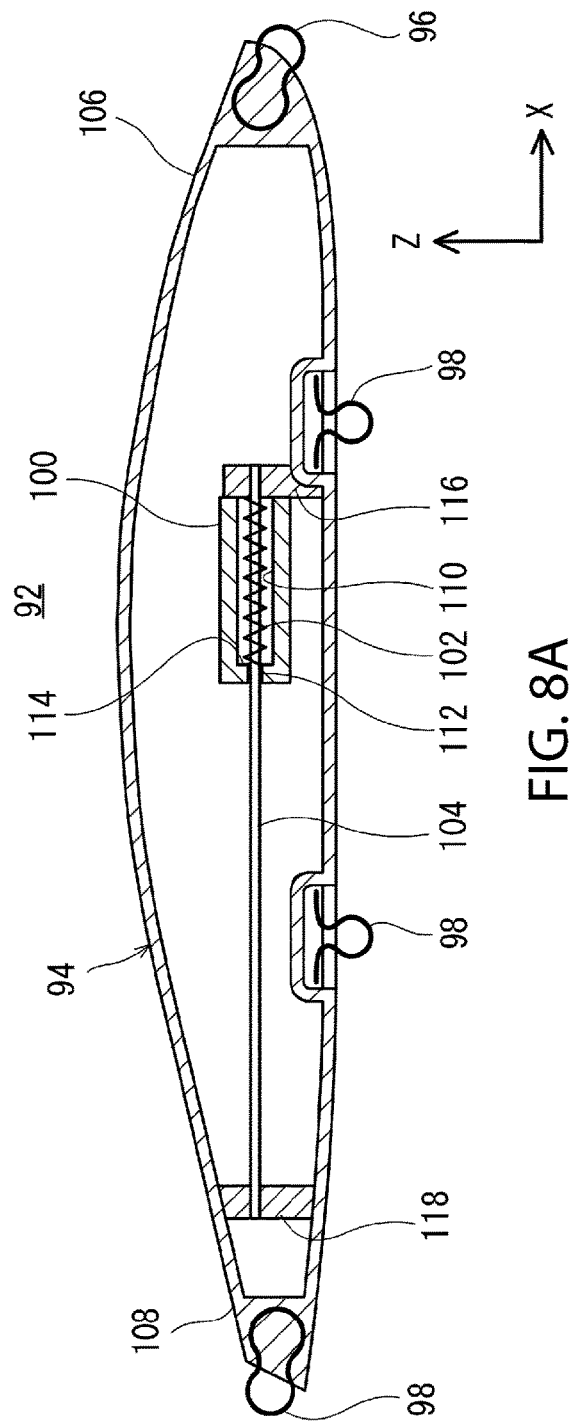
FIG. 8A is a cross-sectional view of a lure according to still another embodiment of the present invention and FIG. 8B is a cross-sectional view showing a state after a weight of the lure in FIG. 8A has moved.
Figure 8B:
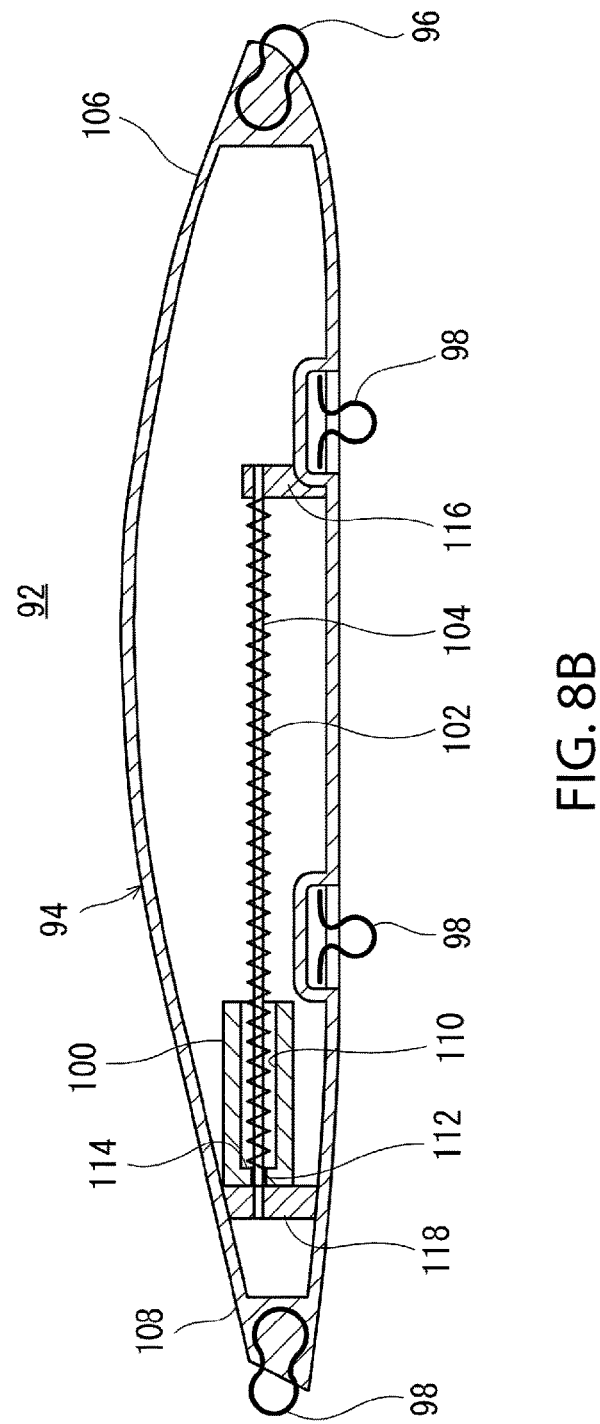

FIG. 8A is a cross-sectional view that illustrates a lure 92 according to still another embodiment of the present invention. This is a cross-sectional view in which the lure 92 is cut along the front-rear direction. In FIGS. 8A and 8B, the direction indicated by arrow X is the front of the lure 92 and the opposite direction is the rear of the lure 92. The direction indicated by arrow Z is the top of the lure 92 and the opposite direction is the bottom of the lure 92. The direction perpendicular to the paper surface is the left-right direction of this lure 92. The lure 2 includes a body 94, a line eye 96, three hook eyes 98, a weight 100, an elastic member 102, and a shaft 104. The body 94, the line eye 96, and the hook eyes 98 of this lure 92 are the same as those of the lure 2 in FIG. 2.

The weight 100 is built-in to the body 94. The weight 100 extends in the front-rear direction. The shape of the weight 100 is a circle on the cross-section of the weight 100 cut in the front-rear direction. As shown in FIGS. 8A and 8B, the weight 100 has a hole 110 extending from the front surface (a surface on a head 106 side) towards the rear (a tail 108 side). The entire elastic member 102 enters the hole 110 from the front side. The elastic member 102 is inserted inside of the weight 100. The hole 110 of the weight 100 constitutes a housing space for housing the elastic member 102, that has an entrance at the front portion.

The weight 100 has a hole 112 passing through from a bottom surface of the hole 110 to the rear surface (a surface on the tail 108 side) of the weight 100. The inner diameter of the hole 110 is larger than the inner diameter of the hole 112. The shaft 104 is inserted into the hole 110 and the hole 112. Thus, the weight 100 is movable in the front-rear direction. The specific gravity of the weight 100 is larger than the specific gravity of the body 94. The examples of the material of the weight 100 include lead, lead alloy, brass, tungsten, tungsten alloy, steel, and stainless steel.

The elastic member 102 is built-in to the body 94, and as shown in FIG. 8A, the elastic member 102 is a coil spring 102. The coil spring 102 in FIG. 8A is in an unstretched state, and thus as can be understood, the coil spring 102 in FIG. 8A is in a free length without a force being applied in the front-rear direction. As it will be described later, the coil spring 102 is significantly stretched by the weight 100 when casting. The coil spring 102 can be used in a stretched state or in a state where no force (i.e., an unstretched state) is applied. Thus, as one of ordinary skill would understand, the coil spring is a tensile coil spring.

The elastic member 102 includes a first point where the elastic member 102 is connected to the body 94 and a second point located behind of the first point where the elastic member 102 is connected to the weight 100. In this embodiment, the front end of the elastic member 102 is the first point and the first point is connected to a front wall 116. The rear end of the elastic member 102 is the second point and the second point is connected to a bottom 114 of the hole 110 of the weight 100. As shown in 8A, a shaft 104 penetrates through the inside of the elastic member 102.

The second point of the elastic member 102 does not have to be the rear end of the elastic member 102, nor does the second point of the elastic member 102 have to be connected to the bottom 114 of the hole 110 of the weight 100. The elastic member 102 and the weight 100 can be connected so that the weight 100 enters the inside of the elastic member 102. The first point of the elastic member 102 does not have to be the front end of the elastic member 102. The first point can be connected to the body 94 in front of the second point so as not to interfere with the movement of the weight 100.

The shaft 104 is built-in to the body 94, and the shaft 104 extends in the front-rear direction. The shaft 104 is bridged between and is fixed to the front wall 116 and a rear wall 118. The shaft 104 penetrates the hole 112 and the hole 110 of the weight 100, and penetrates through the inside of the elastic member 102. The weight 100 is movable in the front-rear direction along the shaft 104, such that the shaft 104 is a guide member that guides the movement of the weight 100 in the front-rear direction.

In the lure 92, by being cast, the body 94 flies through the air and the weight 100 instantly stretches the tensile coil spring 102 due to inertia. The lure 92 in this state is illustrated in FIG. 8B. The weight 100 moves backward against the energizing force of the tensile coil spring 102 until the weight comes into contact with the rear wall 118. In this configuration, the weight 100 has moved to the tail 108 side of the lure 92. Since the lure 92 flies with the tail 108 in front, the lure 92 flies through the air in a state in which the center of gravity is at the front.

The lure 92 slows down due to the resistance of a fishing line and the air while flying through the air. Negative acceleration acts on the lure 92, and at the beginning of the deceleration, the weight 100 is located at the tail 108 side against the energizing force of the tensile coil spring 102 due to inertia. However, as the lure 92 decelerates further, this acceleration decreases. The tensile coil spring 102 energizes the weight 100 forward, and the weight 100 is gradually pulled back towards the head 106 side due to the energizing force of the tensile coil spring 102. After landing on the water, the weight 100 is returned to the position shown in FIG. 8A, such that when the lure 92 swims in the water, the weight 100 is located at the position shown in FIG. 8A. Thus, the lure 92 swims in a state in which the center of gravity closer to the head 106 side than the center.

In the lure 92, the tensile coil spring 102 is inserted inside of the weight 100. As shown in FIG. 8A, when the weight 100 is located at the head 106 side, the weight 100 and the tensile coil spring 102 overlap. The tensile coil spring 102 is not located on the head 106 side of the weight 100, and it is easy to embed other mechanisms in the lure 92.

In the lure 92, the tensile coil spring 102 is inserted inside of the weight 100, therefore, any limitation in the moving range of the weight 100 is small and the degree of freedom in installing a center of gravity shift mechanism is increased. Thus, in the lure 92, it is easy to embed other mechanisms, and the a center of gravity shift mechanism capable of moving a required center of gravity within a limited range is realized. This configuration contributes to an excellent aerial posture and an excellent underwater posture of the lure 92.

In the tensile coil spring 102, the force with which the spring 102 pulls the weight 100 when the spring 102 is most stretched is a maximum energizing force F. The ratio F/W of the maximum energizing force F to a weight W of the weight 100 is preferably 1.0 or more. By setting the ratio F/W to 1.0 or more, the tensile coil spring 102 can pull the weight 100 back towards the head 106 side when the lure 92 is coming down. By setting the ratio F/W to 1.0 or more, the tensile coil spring 102 can pull the weight 100 back to the position of the front wall 116 in a short amount of time, after the lure 92 has landed on the water. This contributes to excellent flight posture and underwater posture of the lure 92. From this point of view, it is more preferable that the ratio F/W is 1.6 or more and 2.0 or more is even more preferable.

The ratio F/W is preferably 4.0 or less. By setting the ratio F/W to 4.0 or less, the weight 100 can immediately move to the position of the rear wall 118 when casting the lure 92. By setting the ratio F/W to 4.0 or less, the weight 100 is prevented from being pulled back to the head 106 side when the lure 92 is getting elevated. This contributes to an excellent flight posture of the lure 92. From this point of view, it is more preferable that the ratio F/W is 3.4 or less and 3.0 or less is even more preferable.

Other Embodiment

Figures 9A, 9B, 9C, 9D:
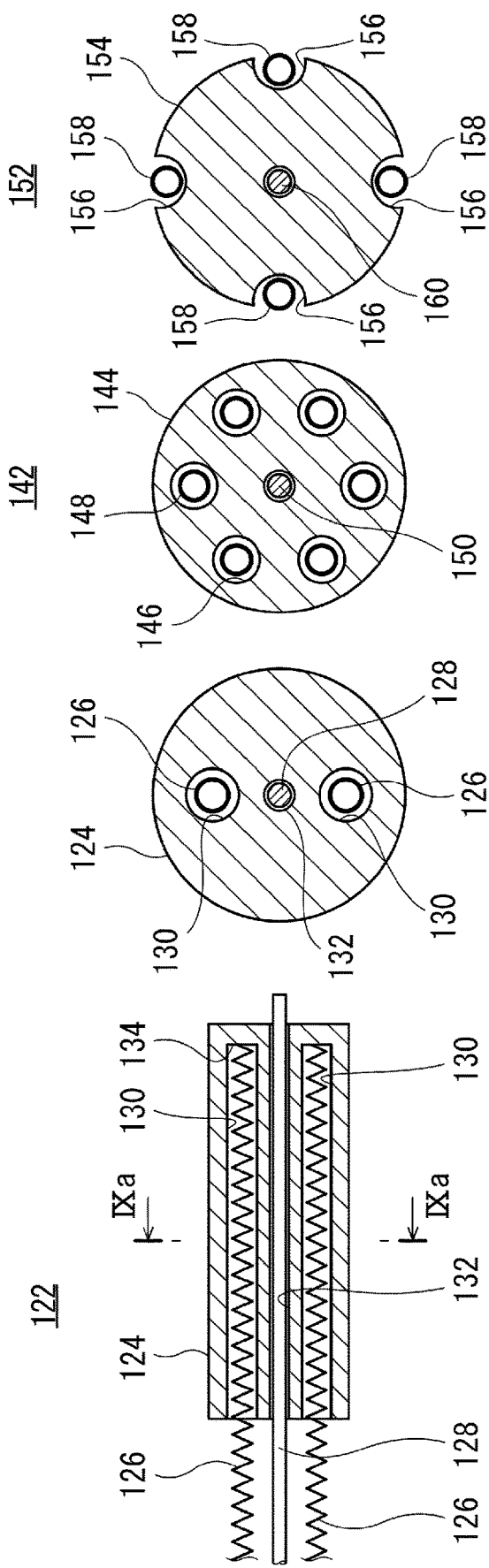
FIG. 9A is a cross-sectional view of a lure according to still another embodiment of the present invention cut along the front-rear direction.
FIG. 9B is a cross-sectional view of the lure in FIG. 9A cut along the left-right direction.
FIGS. 9C and 9D are cross-sectional views of the lures according to still another embodiment in the present invention cut along the left-right direction.

FIG. 9A is a cross-sectional view showing a part of a lure 122 according to still another embodiment of the present invention. FIG. 9B is a cross-sectional view taken along the line IXa-IXa of FIG. 9A. In FIGS. 9A and 9B, a weight 124 of the lure 122, a part of elastic members 126, and a part of a shaft 128 are shown. The lure 122 is the same as the lure 62 in FIG. 7A, except the weight 124 and the elastic members 126.

As shown in FIGS. 9A and 9B, the weight 124 has two holes 130 and one hole 132. Each of the holes 130 extend from a rear surface (a surface on the tail side) of the weight 124 towards the front (the head side). The hole 132 passes through the weight 124 in the front-rear direction. As shown in FIG. 9B, the hole 132 penetrates through the center of the weight 124. The shaft 128 is inserted into the hole 132. Thus, the weight 124 is movable in the front-rear direction.

In this embodiment, there are two elastic members 126. Each of the elastic members 126 enters into the corresponding holes 130 of the weight 124 from the rear side. A hole 130 of the weight 124 constitutes a housing space for housing an elastic member 126, that has an entrance at the rear. The elastic member 126 includes a first point where the elastic member 126 is connected to the body and a second point located in front of the first point where the elastic member 126 is connected to the weight 124. Although not shown, in this embodiment, the rear end of the elastic member 126 is the first point that is connected to the rear wall. The front end of the elastic member 126 is the second point that is connected to a bottom 134 of the hole 130 of the weight 124. As can be understood, the elastic member 126 is a compression coil spring 126.

The shaft 128 is bridged between and is fixed to a front wall and a rear wall. The shaft 128 passes through the hole 132 of the weight 124, such that the weight 124 can move in the front-rear direction along the shaft 128. Accordingly, as can be understood, the shaft 128 can act as a guide member for guiding the movement of the weight 124 in the front-rear direction.

The movement of the weight 124 of the lure 122 in FIGS. 9A and 9B is the same as that of the lure 122 in FIG. 7A. In this lure 122, the compression coil springs 126 that are the elastic members 126 are inserted inside of the weight 124. The compression coil springs 126 do not interfere with the movement of the weight 124 to the tail side, and the weight 124 is capable of moving as far as the rear wall which is a stopper. In the lure 122, the position of the center of gravity in the air can be set to be near the end on the tail side. This configuration contributes to an excellent aerial posture. Thus, as can be understood, the lure 122 is capable of flying far though the aor. In the lure 122, the compression coil springs 126 are inserted inside of the weight 124, therefore, any limitation in the moving range of the weight 124 is small and the degree of freedom in installing a center of gravity shift mechanism is increased. In the lure 122, it is easy to embed other mechanisms.

FIG. 9C is a cross-sectional view showing a part of a lure 142 according to still another embodiment of the present invention. FIG. 9C is a cross-sectional view in which the weight 144 is cut along the left-right direction. In the lure 142, the number of holes 146 and the number of elastic members 148 are increased as compared with the lure 122 in FIGS. 99A and 9B. In the lure 142, the number of the holes 146 of the weight 144 and the number of the elastic members 148 that are inserted into the holes 146 is respectively six. Other than that, the lure 142 is the same as the lure 122 in FIGS. 9A and 9B. In the lure 142, a shaft 150 penetrates through the center of the weight 144 as in the lure 122 in FIGS. 9A and 9B.

The number of the holes in the weight and the number of the elastic members that are inserted into these holes can be other than two as shown in FIG. 9B or six as shown in FIG. 9C. For example, the number of holes can be four, five or seven or more.

FIG. 9D is a cross-sectional view showing a part of a lure 152 according to still another embodiment of the present invention. In the lure 152, a weight 154 has grooves 156 on the outer periphery thereof. In this embodiment, the number of the grooves 156 is four. Each of the grooves 156 extends in the front-rear direction, and elastic members 158 are slotted into the respective grooves 156 from the rear side. The grooves 156 of the weight 154 constitute housing spaces for housing the elastic members 158, that have entrances on the rear. The elastic members 158 are inserted inside of the weight 154. Other than that, the lure 152 is the same as the lure 122 in FIGS. 9A and 9B. In the lure 152, a shaft 160 penetrates through the center of the weight 154 as in the lure 122 in FIGS. 9A and 9B.

The number of the grooves 156 of the weight 154 and the number of the elastic members 158 that are inserted into these grooves 156 can be other than four. The numbers of the grooves 156 and the elastic members 158 can be three or less and five or more.

FIG. 10A is a cross-sectional view showing a part of a lure 162 according to still another embodiment of the present invention. FIG. 10B is a cross-sectional view taken along line Xb-Xb of FIG. 10A. FIG. 10A is a cross-sectional view taken along line Xa-Xa of FIG. 10B. In FIGS. 10A and 10B, a weight 164 of the lure 162, a part of elastic members 166 and a part of a shaft 168 are shown. The lure 162 is the same as the lure 122 in FIG. 7A, except the positions of the weight 164, the elastic members 166 and the shaft 168.

As shown in FIGS. 10A and 10B, the weight 164 has two holes 170 and one hole 172. The elastic members 166 are inserted into the respective holes 170 from the rear side. A hole 170 of the weight 164 has a housing space for housing an elastic member 166, that has an entrance on the rear. In the lure 162, the hole 172 is not located at the center of the weight 164. The hole 172 passes through the weight 164 in the front-rear direction above the center of the weight 164. The shaft 168 is inserted into the hole 172, and the shaft 168 penetrates through the upper side of the center of the weight 164.

FIG. 10C is a cross-sectional view showing a part of a lure 182 according to still another embodiment of the present invention. This is a cross-sectional view in which a weight 184 is cut along the left-right direction. The weight 184 has a cut-out portion 186 which passes through in the left-right direction and extends from the rear end towards front. The cut-out portion 186 does not reach the front end. The elastic members 188 are inserted into the cut-out portion 186 from the rear side. The cut-out portion 186 of the weight 184 constitutes housing spaces for housing the elastic members 188, that have entrances at the rear. In this embodiment, the number of the elastic members 188 is two. In the lure 182, the hole 190 penetrates the weight 184 in the front-rear direction above the center of the weight 184. A shaft 192 is inserted into the hole 190, and the shaft 192 penetrates through the upper side of the center of the weight 184.

FIG. 10D is a cross-sectional view showing a part of a lure 202 according to still another embodiment of the present invention. This is a cross-sectional view in which a weight 204 is cut along the left-right direction. In this embodiment, the lower half of the weight 204 is missing. This cut-out portion 206 extends from the rear end towards front side, but does not reach the front end. Elastic members 208 are inserted into the cut-out portion 206 from the rear side. The cut-out portion 206 constitutes housing spaces for housing the elastic members 208, that have entrances at the rear. In this embodiment, the number of the elastic members 208 is three. In the lure 202, the hole 210 is not located at the center of the weight 204. The hole 210 penetrates into the weight 204 in the front-rear direction above the center of the weight 204. A shaft 212 is inserted into the hole 210. The shaft 212 penetrates through the upper side of the center of the weight 204.

Figure 11:
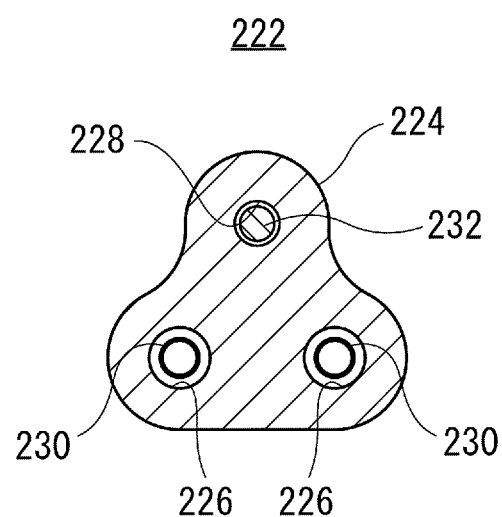
FIG. 11 is a cross-sectional view of a lure according to still another embodiment of the present invention cut along the left-right direction.

FIG. 11 is a cross-sectional view showing a part of a lure 222 according to still another embodiment of the present invention. This is a cross-sectional view in which a weight 224 is cut along the left-right direction. The cross-sectional shape of the weight 224 is not a circle. That is, as can be understood, the lower portion of the weight 224 is larger than the upper portion. The gravity center of the weight 224 is located below the center. The weight 224 has two holes 226 and one hole 228, and elastic members 230 are inserted into the respective holes 226. In the lure 222, the hole 228 is not located at the center of the weight 224. The hole 228 penetrates through the weight 224 in the front-rear direction above the center of the weight 224. A shaft 232 is inserted into the hole 228. The shaft 232 penetrates through the upper side of the center of the weight 224.

In the embodiments described above, inner diameters of the coil springs, that are elastic members, are constant. The inner diameter of a coil spring does not have to be constant. For example, an elastic member can be a conical spring in which the inner diameter gradually changes.

In the embodiments described above, the elastic members are coil springs. As an elastic member that enters the inside of a weight, a spring formed by folding a metal in a bellows can be used. An elastic member can be rubber. Other elastic members can be used.

In the embodiments described above, the guide members are shafts. A guide member can be a wire made of a metal wire. In this embodiment, a wire is bridged between a front wall and a rear wall. This wire penetrates a hole in a weight. Typical materials for the wire include steel, stainless steel, copper alloys, and titanium alloys.

As described above, a lure according to embodiments of the present invention has a center of gravity shift mechanism capable of maximally moving the center of gravity within a limited range. With this center of gravity shift mechanism, excellent aerial posture and underwater posture of a lure are realized. Therefore, it is obvious the present invention has advantages.

The lure according to the present invention is suitable for fishing in various fields, such as lakes, ponds, dams, rivers, and the sea.

What is claimed is:
1. A lure comprising:
   a body that is hollow and having a head in a front portion and a tail in a rear portion thereof;
   a weight inside of the body so as to be movable in a front-rear direction, the weight having a housing space defined within an interior of the weight;
   a guide member in the body and configured to guide movement of the weight in the front-rear direction; and
   an elastic member in the body and configured to generate an energizing force to move the weight in a forward direction, the elastic member configured to enter the housing space and in a first uncompressed or partially compressed state having a first length that is longer than a length of the housing space, and in a second partially or fully compressed state, the elastic member has a second length that is substantially the same as the length of the housing space, and the weight configured to be movable backward against the energizing force of the elastic member.

2. The lure according to claim 1, wherein the weight has an opening to the housing space in a front or a rear thereof.

3. The lure according to claim 1, wherein the housing space is a hole or a groove.

4. The lure according to claim 1, wherein the elastic member has a first point connected to the body and a second point located in front of the first point, where the elastic member is connected to the weight; and the elastic member is configured to be compressed by the weight when moving backward when casting.

5. The lure according to claim 4, wherein the ratio of a maximum energizing force of the elastic member to a weight of the weight is 1.0 or more and 4.0 or less.

6. The lure according to claim 1, wherein a density of the weight is 18.0 g/cm$^3$ or more.

7. The lure according to claim 1, wherein the guide member is attached to the body and penetrates the weight in the front-rear direction.

* * * * *